Nov. 5, 1935.        A. G. D. WEST        2,019,882
INDICATING SCALE FOR WIRELESS RECEIVERS
Filed Aug. 21, 1930
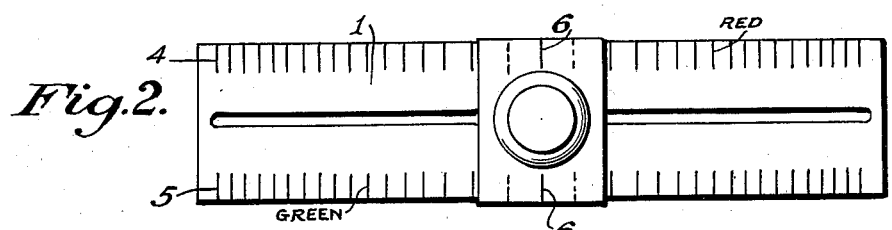
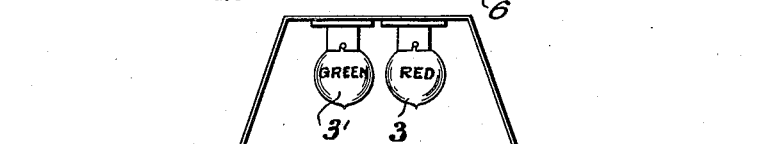
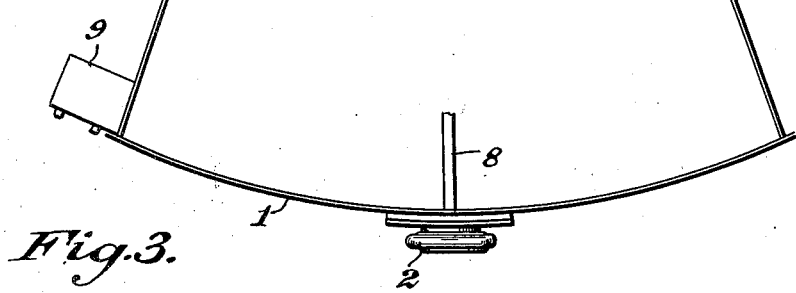
Inventor:
Arthur Gilbert Dixon West,
by  T. R. Goldsborough,
His Attorney.

Patented Nov. 5, 1935

2,019,882

UNITED STATES PATENT OFFICE 2,019,882

INDICATING SCALE FOR WIRELESS RECEIVERS

Arthur Gilbert Dixon West, Beckenham, England, assignor, by mesne assignments, to Radio Corporation of America, New York, N. Y., a corporation of Delaware Application August 21, 1930, Serial No. 476,922
In Great Britain August 26, 1929

14 Claims. (Cl. 177—311)

The present invention relates to indicating scales such as are used with the tuning controls of wireless receivers and in particular to apparatus in which an indicator moves relatively to two fixed scales which are adapted for use with one of two alternative circuit arrangements within the apparatus. For example, each scale may correspond to one of two different frequency bands covered by the tuning range of a wireless receiver.

In such a tuning control, the two scales are usually printed one above the other upon a dial and errors are liable to occur arising from the use of the inappropriate scale.

It is an object of the present invention to provide means whereby the use of the appropriate scale is facilitated.

According to the present invention as applied to a tuning control for a wireless receiver employing two scales corresponding to two different frequency bands covered by the tuning range of the receiver, there are provided means whereby one of the scales is automatically rendered substantially invisible when the receiver is set for the frequency band corresponding to the other scale.

The invention will be illustrated by way of example with reference to the accompanying drawing which shows the invention as applied to an apparatus such as the tuning control of a wireless receiver, provided with an indicating scale means embodying the invention, Fig. 1 being a diagrammatic plan view thereof; Fig. 2 being a front view of the same in elevation and Fig. 3 being a schematic wiring diagram embodying the apparatus shown in Figs. 1 and 2.

Referring to the drawing, the calibrations of the two scales 4 and 5 are each printed in a different color upon a transparent strip or dial I (for example of celluloid). Red and green are a suitable pair of colors for this purpose. The tuning knob 2 with an indicator or pointer 6 attached, moves over the dial, and operates a control means such as a tuning device or condenser 7 (Fig. 3) of the apparatus through a suitable connecting means indicated by a shaft or lever 8. The dial upon which the scales are printed is illuminated selectively by either a red or a green electric lamp 3, 3' respectively, both of which may be placed behind the dial as indicated.

When the red light alone is energized and lighted, the red scale, which may be considered as scale 4, becomes substantially invisible whilst the green scale 5 appears as a series of black markings upon a red background. When the green light is energized and lighted, the red scale alone is visible. A switch 9 provided for changing the receiver from a condition suitable for the reception of short waves to that for the reception of long waves also changes the color of the dial illumination, and thus only the scale corresponding to the frequency band to be received is visible, or at least one scale is rendered much more readily visible than the other.

One circuit arrangement for carrying out the above control is indicated in Fig. 3, in which the switch 9 is provided with two sets of selector contacts 10 and 11, the former contacts being connected with wave band changing taps on a tuning coil 12 associated in a tuned circuit 13 with the tuning condenser 7, and the latter contacts being arranged in circuit with the lamps 3—3' to selectively energize them from a supply circuit 14. When the switch is in the position shown, the red lamp is energized and the green scale is made visible while shorter wave tap on the coil provides a condition of operation for the short waves, while in the reverse position the green lamp is energized and the red scale is made visible and the longer wave tap on the coil provides a condition of operation for long waves.

While the particular embodiment of the invention which has been illustrated and described provides for the direct illumination of the dial by two light sources, and a dial having two scales, it should be understood that the invention is not limited thereto, since it is obvious to one skilled in the art that any suitable method of illumination other than the direct method employed in the present example may be followed, and that more than two scales may be employed and selectively rendered visible in the same manner.

It will be evident that the invention may further be applied to apparatus other than wireless receivers. For example, it may be applied to a double range measuring instrument. Further, it will be evident that with more than two different scales any one may be rendered visible at will.

I claim:

1. In an electrical apparatus, an indicating device including a dial having a pair of scales the calibrations of which are of contrasting colors, means arranged to illuminate the dial and the scales selectively with each of said contrasting colors, and means for selectively controlling a condition of operation of said apparatus connected with said last named means for simultaneous operation therewith.

2. In an electrical apparatus, the combination of a control means therefor, an indicating device connected with said control means and including a dial having a pair of scales the calibrations of which are of contrasting colors, a pair of lamps, arranged to illuminate the dial and scales with the same contrasting colors as each of the first named colors, an indicator for said dial connected with said control means and arranged to move adjacent to said scales, means operable by said control means for selectively energizing said lamps.

3. The combination with an adjustable device, of means for selectively effecting adjustment of said device including visible indicating means having a pair of scales the calibrations of which are of contrasting colors, means operable to illuminate the scales selectively with the same contrasting colors as the colors of the scale calibrations, and a common means for operating the first named means and the illuminating means.

4. In a radio apparatus, the combination with a movable control means arranged to control a condition of operation thereof, of an indicating means including indicating scales provided with calibrations of contrasting colors, an indicator therefor; means adapted selectively to illuminate the scales in each of said contrasting colors to reduce the visibility of at least one of said scales, means for selectively changing from one predetermined range to another the condition of operation of said apparatus controlled by said movable control means, and means for operating the last named means and the illuminating means simultaneously.

5. The combination with an adjustable wave band apparatus and means for selectively effecting adjustment thereof, of a dial means having a plurality of scales corresponding each to one of said wave bands, said scales having calibrations of contrasting colors, means for indicating on said dial the wave band adjustment of the apparatus, said means including a plurality of lamps of the same contrasting colors as the calibrations of the scales arranged to illuminate said dial, and means for selectively energizing said lamps, said last named means being arranged to be operated simultaneously with the first named means.

6. In a radio apparatus, the combination of circuit means adjustable for response to a plurality of frequency bands, means for selectively effecting said adjustment of said circuit means, an indicating dial having a plurality of scales one corresponding to each frequency band, said scales having calibrations of contrasting colors one scale with respect to another, indicator means therefor movable with respect to said scales, and means for illuminating the scales selectively with the same contrasting colors as the calibrations of the scales in response to operation of said circuit adjusting means.

7. The combination with an adjustable device, of means for selectively effecting adjustment of said device, including visible indicating means having a pair of scales, the calibrations of which are in complementary colors, means operable to illuminate the scales selectively in the complementary colors of the scale calibrations, whereby but one of the scales is made visible, and common means for operating the first named means and the illuminating means.

8. Indicating means for electrical apparatus of the type having two alternative sets of electrical connections for its component parts, comprising two indicating scales, one corresponding to each of said sets of connections, the markings of one scale being complementary in color to the markings of the other scale, means providing two sources of light of complementary colors corresponding to those of the scale markings, and means for alternatively illuminating said scales by either of said light sources.

9. Indicating means for electrical apparatus of the type having two alternative sets of electrical connections for its component parts, comprising two indicating scales, one corresponding to each of said sets of connections, the markings of one scale being complementary in color to the markings of the other scale, means providing two sources of light of complementary colors corresponding to those of the scale markings, means for alternatively illuminating said scales by either of said light sources, and means interlocking with said last named means for changing said electrical connections of the apparatus.

10. Indicating means for electrical apparatus of the type having two alternative sets of electrical connections, comprising two indicating scales, corresponding each to one of said sets of connections, and means for automatically and selectively illuminating said scales with light of a color to render substantially invisible one of said scales in response to the adjustment of said apparatus for operation with a set of connections corresponding to the other scale.

11. Indicating means for radio apparatus comprising two dial-scales corresponding, respectively, to two different frequency-bands covered by the tuning range of the apparatus, switching means for selecting the band to be received, illuminating means individual to the scales, and means inter-connected with the switching means for so controlling the illuminating means as to effectively render visible the scale corresponding to the band to which the receiver is adjusted while reducing the visibility of the other scale, thereby showing which scale is to be read by the operator.

12. Indicating means for electrical apparatus of the type having at least two alternative sets of electrical connections, comprising at least two indicating scales, corresponding each to one of said sets of connections, at least two light sources, corresponding each to one of said scales, and switching means for selectively rendering effective either of said sets of connections and for simultaneously energizing the light source allocated to the scale corresponding thereto.

13. In a multi-range radio receiver, at least two alternative sets of electrical connections respectively covering different frequency-ranges, at least two indicating scales corresponding each to one of said sets of connections, at least two light sources corresponding each to one of said scales, and switching means for selectively rendering effective either of said sets of connections and for simultaneously energizing the light source allocated to the scale corresponding thereto.

14. In a multi-range radio receiver, at least two alternative sets of electrical connections respectively covering two different frequency-ranges, an adjustable tuning element common to said sets, two dial scales disposed adjacent to one another and corresponding each to one of said sets of connections, an indicator for said tuning element mounted for movement adjacent to said scales, switching means for selecting one of said sets of electrical connections, illuminating means for said scales and means connected to said switching means for simultaneous actuation therewith for so modifying light from said source as to effectively illuminate the scale corresponding to the selected set of electrical connections.

ARTHUR GILBERT DIXON WEST.